United States Patent [19]
Filipe

[11] 3,883,958
[45] May 20, 1975

[54] METHOD AND APPARATUS FOR ACCELERATED FREEZE DRYING

[76] Inventor: Antonio Domingos Filipe, Avenida Almirante Gago Coutinho, 3-3°, Lisbon, Portugal

[22] Filed: Jan. 14, 1974

[21] Appl. No.: 433,282

[30] Foreign Application Priority Data
Mar. 10, 1973 Portugal.................................. 59498

[52] U.S. Cl............................................ 34/5; 34/92
[51] Int. Cl............................................... F26b 5/06
[58] Field of Search................ 34/5; 34/92; 426/234

[56] References Cited
UNITED STATES PATENTS

| | | | |
|---|---|---|---|
| 2,585,825 | 2/1952 | Nyrop.................................. | 34/5 X |
| 3,048,928 | 8/1962 | Copson et al........................ | 34/5 X |
| 3,460,269 | 8/1969 | Kessler................................. | 34/92 |
| 3,531,871 | 10/1970 | Sahara.................................. | 34/5 |
| 3,616,542 | 11/1971 | Rader................................... | 34/5 |
| 3,716,382 | 2/1973 | Chandrasekaran et al............... | 34/5 |

Primary Examiner—John J. Camby
Attorney, Agent, or Firm—Steinberg & Blake

[57] ABSTRACT

A method and apparatus for freeze drying food products in an accelerated manner. The food product is situated in a frozen condition in an evacuated chamber where the food product is initially exposed to heat resulting from infrared radiation. As soon as a given temperature differential exists between the exterior surface of the food product and the interior of the food product, which contains the water to be driven out of the food product, additional heating is applied to the food product, while maintaining the infrared heating. This additional heating is provided by situating the food product between capacitor elements with the food product itself acting as a dielectric so that the energy of a radio frequency field applied between the capacitor elements is converted into heat by dielectric losses with the food product itself serving as the dielectric material, to achieve in this way an accelerated freeze drying resulting from the simultaneous application of heat by way of dielectric losses occurring in the material to be freeze dried and the infrared radiation. The controls are such that the temperature at the interior of the food product is maintained equal to the temperature at the exterior thereof.

26 Claims, 13 Drawing Figures

METHOD AND APPARATUS FOR ACCELERATED FREEZE DRYING

BACKGROUND OF THE INVENTION

The present invention relates to method and apparatus for freeze drying food products.

As is well known, freeze drying is a process for dehydrating food products by sublimation in an evacuated atmosphere.

Conventional freeze drying includes a number of steps. Thus, the material to be dehydrated is frozen at a temperature and speed depending upon the type of material. The frozen material is then placed in a chamber which is evacuated to a degree which also depends upon the nature of the material which is to be freeze dried. During sublimation (transfer of free water in the material directly into the gaseous state from the solid state), it is necessary to supply energy to the molecules of water without, however, melting the frozen material. During the second dehydrating phase, which is to say after the greatest part of the free water has been eliminated by sublimation, the remainder of the water (compositional water) is eliminated by evaporation. The water which is freed during dehydration is fixed in a condenser which possesses a chilled surface having a temperature of less than 40° C and dimensions which are determined by the quantity of water to be fixed. The material which has been dehydrated is then enclosed within a sealed package in which there prevails an evacuated or inert atmosphere.

Various proposals for carrying out the freeze drying have already been made in order to eliminate drawbacks such as excessive lengths of time and high cost of equipment as well as possible dangers in the operation. Thus it has already been proposed and described by Copson and his collaborators in 1957 to apply heat to the product which is to be freeze dried exclusively by radio frequency in order to obtain a freeze drying method of extremely short duration. However a practical realization of this latter technique has always presented great difficulties because of the requirement of extremely large sources of power in order to heat several hundred kilos of the material to be freeze dried. The use of these high sources of power necessitates the use of extremely high voltages which in combination with the low pressure in the evacuated atmosphere gives the risk of electrical discharge between the electrodes with the result that the material to be freeze dried is frequently scorched or burned.

In addition to the latter inconveniences, there is also the disadvantage of an extremely high cost for the structure, and because of all of the above factors it has not been possible practically to provide a method and apparatus operating according to the latter principles.

SUMMARY OF THE INVENTION

It is accordingly a primary object of the present invention to provide a method and apparatus which will avoid the above drawbacks.

In particular it is an object of the present invention to provide a freeze drying method and apparatus capable of effectively carrying out freeze drying of food products in an extremely short period of time without any danger of burning the food product and without any danger of undesirable electrical discharge.

Also it is an object of the present invention to provide a method and apparatus of the above type which does not require a large source of power and which can be carried out with an installation which can be manufactured at a relatively low cost.

According to the present invention the accelerated freeze drying is carried out by simultaneously heating the material to be freeze dried with two heat sources one of which is derived from infrared rays and the other of which is derived by situating the material to be freeze dried so that it will act as a dielectric with heat being generated in the material as a result of dielectric losses thereof.

In connection with this latter type of heating of the material to be freeze dried, in accordance with the invention, it is an object to provide a method and apparatus which make it possible to maintain the surface at the exterior of the material to be freeze dried and the interior of the material at equal temperatures.

Thus, with the method and apparatus of the present invention it is possible to achieve a freeze drying cycle of operation which is of extremely short duration as compared with the presently known methods and apparatus for freeze drying food products.

Thus, the method and apparatus of the present invention differs from conventional methods and apparatus in that the food product, after being situated in a frozen condition in an evacuated atmosphere, is heated from different sources of heat simultaneously to provide the molecules of water in the food product with the energy necessary for sublimation and evaporation.

The heating of the material which is to be freeze dried is obtained in accordance with the present invention by means of infrared rays with a small part of the heating resulting from conduction and convention, and also by means of dielectric losses.

At the end of a few minutes the material which is to be freeze dried, as a result of sublimation which starts immediately because the material is in an evacuated atmosphere, has a superficially dry zone, but still contains in its interior all or nearly all of the water which was previously present. In order not to stop the sublimation it is essential to heat the material. However the temperature at the interior is always less than that at the outer surface, because of the difficulty in transferring energy from the exterior to the interior of the material, and these difficulties increase in proportion to the increase in the thickness of the dry layer at the outer surface region of the material. Since the heating of the surface of the material to be freeze dried is necessarily limited by the nature of the material, the energy of the molecules of water in the interior of the material remains always below the optimum level for sublimation, with the result that normally dehydration requires an undesirably long period of time.

In accordance with the present invention the starting of the freeze drying is entirely conventional and it is only after a few minutes that the maximum difference between the temperature at the surface and the temperature at the interior of the material is achieved, when in accordance with the present invention the starting of the heating by way of causing dielectric losses is carried out, in order to elevate the temperature in the interior of the material to the level of the temperature at the exterior of the material, and for this purpose the energy of a radio frequency field is transformed for the most part into thermal energy in the interior of the material by way of dielectric losses, particularly at the locations in the interior of the material where the water is situated.

From the moment when heating by way of dielectric losses is started up to the end of the freeze drying according to the present invention, the material to be freeze dried is always heated simultaneously by infrared rays as well as by the radio frequency field, and the temperatures at the exterior surface and the interior of the material are always maintained equal.

This double heating which is described above serves to maintain the two temperatures, namely the exterior and interior temperatures of the material, at the same level, and the method and apparatus for operating in this latter manner has not been known up to the present time and has not been used for freeze drying purposes. This particular method and apparatus makes it unnecessary to use radio frequency generators of high power, and thus makes it possible to apply to the electrodes relatively low voltages with a consequent reduction in the risk of discharge and burning of the material to be freeze dried, while at the same time the cost of the installation is considerably reduced.

According to the principles of the present invention it is possible to calculate the power required for the radio frequency generator installation in the following manner.

It is known that the power necessary to produce in a mass of $m$ grams an elevation of temperature $\Delta t$ in degrees centigrade in a time $t'$, is given by the expression:

$$p_1 = 4.2 \, Ce \, \Delta t \, m/t'$$

in which Ce is the specific calorific capacity and $t'$ is the number of seconds during which heating is applied.

Inasmuch as the transformation of electrical energy into heat, in a radio frequency field, is brought about with an efficiency of 60–70 percent, the power for the generator of the radio frequency field will have a value $p_2$ between:

$$p_1 \times 100/70 \text{ and } P_1 \times 100/60$$

The formula which defines the heating in the radio frequency field of a homogeneous dielectric which completely fills the space between electrodes separated by a distance $d$ in centimeters, on the other hand, is the following:

$$P_2 = 0.566 \, E_d^2 \, Vf\epsilon$$

in which
$E_d$ = the voltage gradient
$f$ = a frequency
$V$ = the volume of the material to be heated
$\epsilon$ = the loss factor, equal to the product of the power factor and the dielectric constant.

As a generator of radio frequency energy it is possible to utilize in accordance with the invention electronic valve generators, magnetron generators, Klystron generators, or amplitron generators, in accordance with the required power as a function of the quantity of material to be heated.

If it becomes necessary to apply more power than that which is achieved from a single relatively small generator, it is possible to utilize a plurality of small generators, and in fact such an arrangement is more practical and more economical inasmuch as it is possible to obtain in this way an increase in the uniformity of the field of microwaves, and it is only required to hold in reserve a lesser amount of capital for the equipment which is not used and there is never a total interruption in the operation of the installation in the case where damage of a generator occurs. These latter factors are indeed of great importance.

The generator which is considered most readily applicable in accordance with the present invention is that which is mounted in $\pi$, while it is possible alternatively to apply a mounting in a tank with the disposition and electrical connection of electrodes in the freeze drying chamber carried out in accordance with the description presented below.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
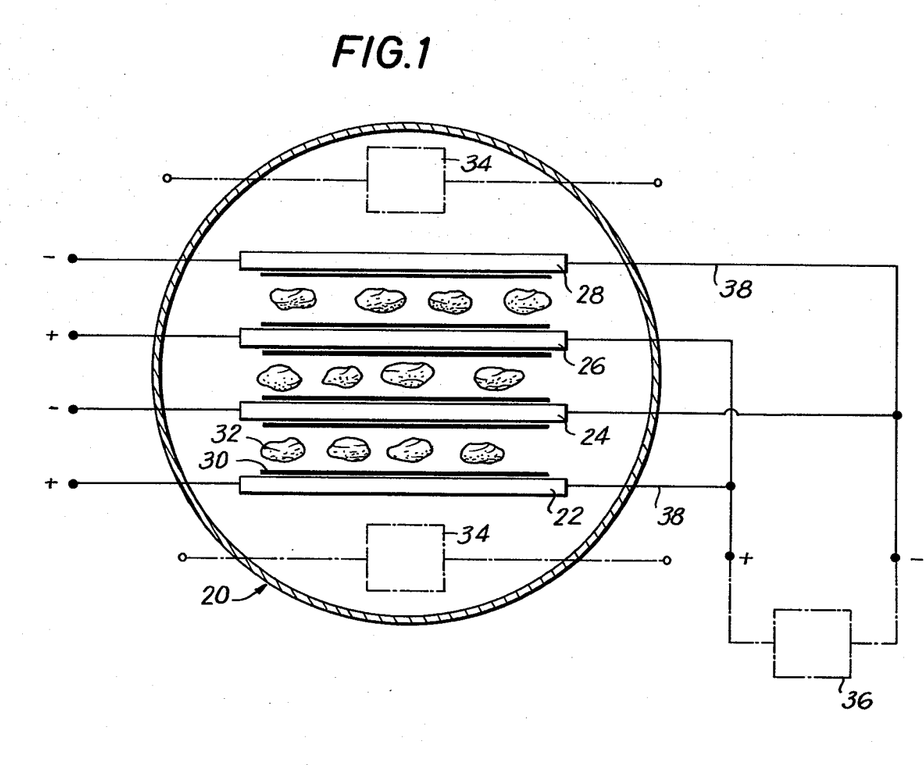
FIG. 1 is a schematic transverse sectional illustration of an evacuated chamber in which the food product is placed to have the water removed therefrom in accordance with the present invention.

Referring now to FIG. 1, there is illustrated therein one possible arrangement of electrical connections with plates in an evacuated chamber where the material to be freeze dried is situated. Thus, FIG. 1 shows in a schematic cross section the evacuated freeze drying chamber 20 having therein the various plates 22, 24, 26, 28 between which is located the material 32 which is schematically illustrated and which is to be freeze dried, with suitable separating sheets 30 being situated between the plates 22, 24, 26, 28 and the material 32 in order to maintain the material out of engagement with the plates. These sheets 30 may be made of a fabric or plastic mesh or the like and are of no interest in connection with the operation serving only to separate the material 32 from direct contact with the electrically conductive plates 22, 24, 26, 28. These plates are mounted in any suitable way in the interior of the cylindrical chamber 20, which is evacuated in any suitable way so as to be maintained at a vacuum, with the plates being insulated from the wall which defines the evacuated enclosure 20. As is schematically illustrated in the wiring diagram of FIG. 1, the various electrically conductive plates 22, 24, 26, 28 are electrically connected by way of conductors 38 with a source of energy 36.

The source of energy 36 may take the form of a single generator as illustrated, electrically connected with the plates 22, 24, 26, 28 in the manner illustrated, although it is also possible to provide two generators one of which may be electrically connected with the plates 22 and 24 while the other is electrically connected with the plates 26 and 28.

FIG. 1 also schematically illustrates sources 34 of infrared radiation for applying heat resulting from infrared radiation to the material 32 to be freeze dried.

In the case where two generators are used care must be taken to start the operation of the two generators simultaneously with the simultaneously oscillation of the generators being in phase opposition to each other and with the oscillation always being maintained precisely at the same frequency.

In accordance with the present invention the same principle of operation can be utilized with evacuated chambers having a larger number of plates.

The range of frequency utilized in the process of the invention are defined by the Federal Communications Commission. The frequencies which are selected for the process are those which according to experience are most easy to utilize, having the greatest thermal efficiency and the easiest ionization of the residual atmosphere.

The degree of vacuum utilized in the chamber 20 in order to carry out the method of the invention depends upon the material to be freeze dried, and in particular in accordance with the organoleptic properties which it is desired to maintain. Also the degree of vacuum is chosen in accordance with the frequency and intensity of the radio frequency field used to bring about ionization and/or polarization of the molecules of the residual atmosphere, including the water which is sublimated or evaporated. The extent of vacuum utilized will be generally situated between 10 and 1,000 $\mu$ of mercury.

The ionization and/or polariziation of the molecules of free water of the material are utilized in order to orient the displacement and increase the speed of the molecules which are directed toward a condenser surface, with the water being fixed at the condenser.

In order to increase the fixation of the molecules of ionized and polarized water at the chilled condenser surface, a condenser which is utilized in accordance with the invention includes two tubular sections through which a refrigerating fluid flows from one section toward the other across a tube which is electrically and thermally insulated and which is superficially heated by way of an electrical resistance provided with a source on the order of 2–5 volts. Thus, the molecules of water do not become deposited on the tube itself.

The two sections of the condenser are connected one to the positive pole and the other to the negative pole of a direct current generator which at the same time serves to supply energy to the high frequency oscillator in a manner forming an electrostatic field in which the condenser is situated.

In installation of an industrial type it is possible to utilize two condensers which function alternatively.

Thus, while one of the condensers serves to fix the water, the other serves to carry out an unfreezing operation according to a system which has already been applied in many presently existing freeze drying installations. In order to obtain a rapid unfreezing with the process according to the present invention, the heating of the condenser is not carried out in a conventional manner but instead is carried out by induction, utilizing as a source of energy the same source which serves to heat the material to be freeze dried by dielectric losses.

For this purpose the insulated terminal of the high frequency generator, which is mounted in $\pi$, is connected at a proper time to a conductor which extends along the interior of a tubular spiral of the condenser, in such a way as to obtain an inductive heating in the two condenser sections which at this particular moment are disconnected from the direct current source and are grounded.

In order to control the heating of the material to be freeze dried, the present invention provides a cybernetic feedback system which is based on variations in the dielectric constant of the material which is to be freeze dried, while responding to variation in the frozen material as it approaches the fusion point and while the quantity of water in the material diminishes. Above and below predetermined values of the dielectric constant, in accordance with the material which is to be dried, an interruption in the heating by dielectric losses is carried out and also when there are higher values an interruption in the infrared heating is carried out.

The following are some specific examples of the freeze drying method of the invention, referring specifically to four products chosen from a greater number of products from tests carried out by the inventor, with these specific examples being considered as sufficiently significant, these examples being illustrated in FIGS. 2–5.

EXAMPLE I

Figure 2:
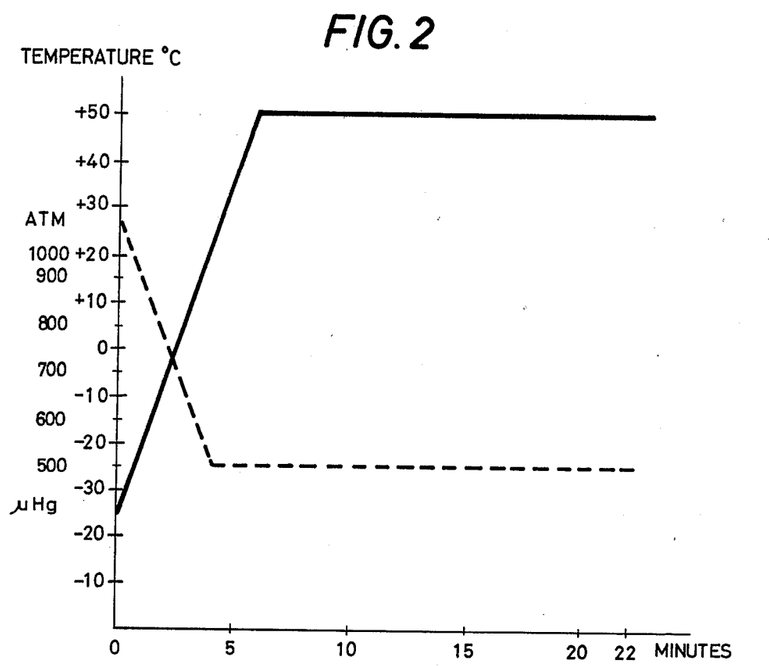
FIGS. 2–5 are respectively graphs illustrating the manner in which the process of the present invention operates with different specific food products.

FIG. 2 is a graph illustrating the method of the invention as carried out in connection with the freeze drying of green peas. The entire freeze drying operation required 22 minutes with the temperature at the interior and exterior surface of the green peas being maintained constant and rising initially from a temperature approximately −25° C to a temperature of +50° C in a period of 5 minutes, and the temperature then being maintained constant at this latter value for the remaining 17 minutes required for the freeze drying operation. This is illustrated by the solid curve in FIG. 2. At the same time the pressure was maintained in accordance with the dotted line curve of FIG. 2. Thus it will be seen that the pressure dropped in less than 5 minutes from atmospheric pressure down to approximately 500 $\mu$ of mercury, with the pressure of the evacuated atmosphere being maintained at this latter value through the remainder of the operating cycle.

EXAMPLE II

Figure 3:
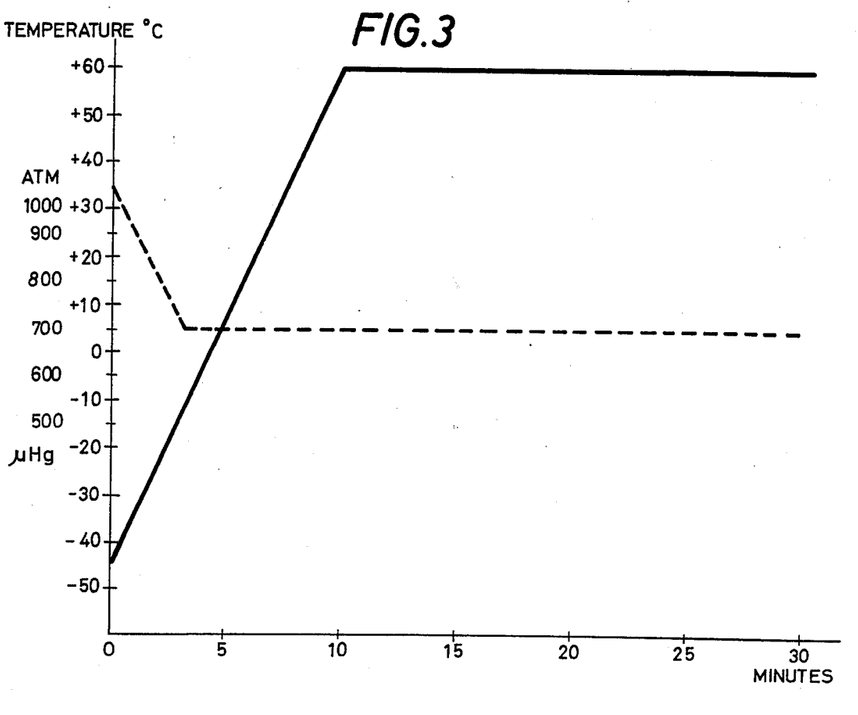

FIG. 3 illustrates the method of the invention as applied to beer wort. The entire freeze drying cycle required 30 minutes with the temperature in this case being elevated in the interior and at the exterior surface of the material from −45° C to +60° C in a period of approximately 10 minutes with the temperature then being maintained at this latter value throughout the remainder of the operating cycle. At the same time, it will be seen from FIG. 3 that the pressure dropped in approximately 3 minutes from atmospheric pressure to a pressure of 700 $\mu$ of mercury, and the evacuated atmosphere was maintained at this latter pressure throughout the remainder of the method as shown by the dotted curve of FIG. 3.

EXAMPLE III

Figure 4:
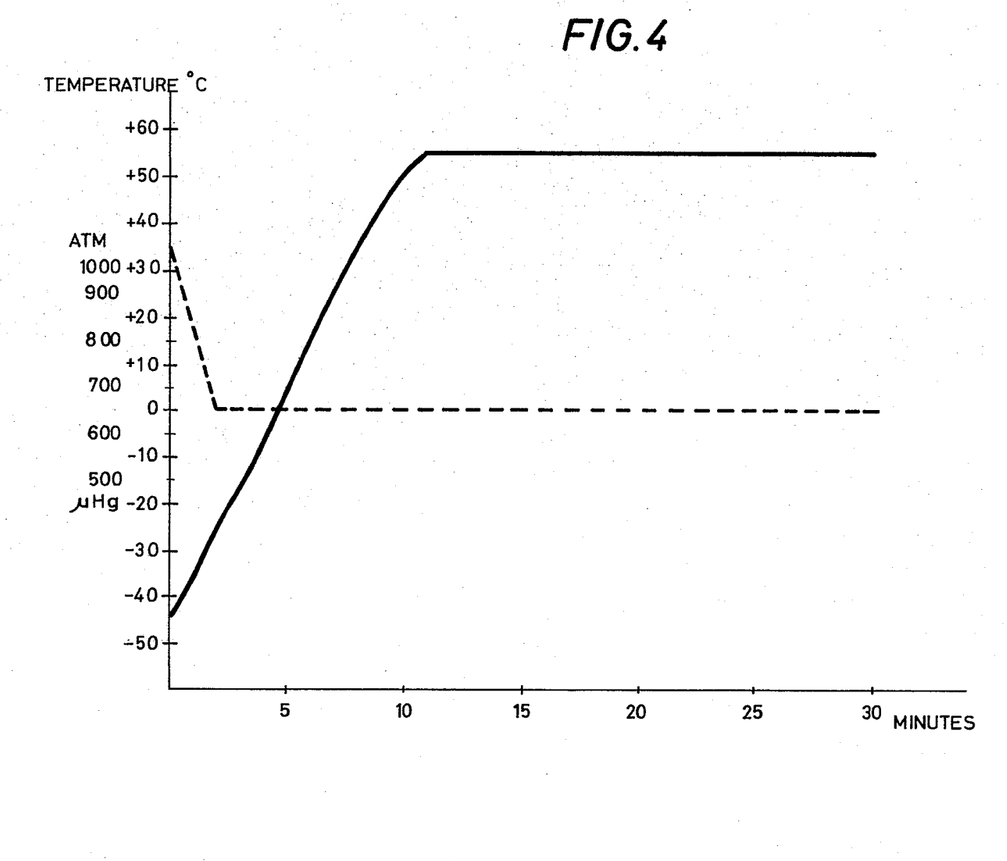

FIG. 4 is a graph illustrating the method of the invention as applied to a 25 percent coffee extract. In this case, the entire freeze drying cycle required 30 minutes. As is apparent from the solid line curve the temperature was raised from −45° to +55° C in a period of approximately 10 minutes with the temperature being maintained at this latter value throughout the remainder of the operating cycle. At the same time, as shown by the dotted curve of FIG. 4, the pressure dropped from atmospheric pressure to 650 $\mu$ of mercury in a period of approximately 2 minutes, with the evacuated atmosphere being maintained at this latter pressure throughout the remainder of the operating cycle.

EXAMPLE IV

Figure 5:
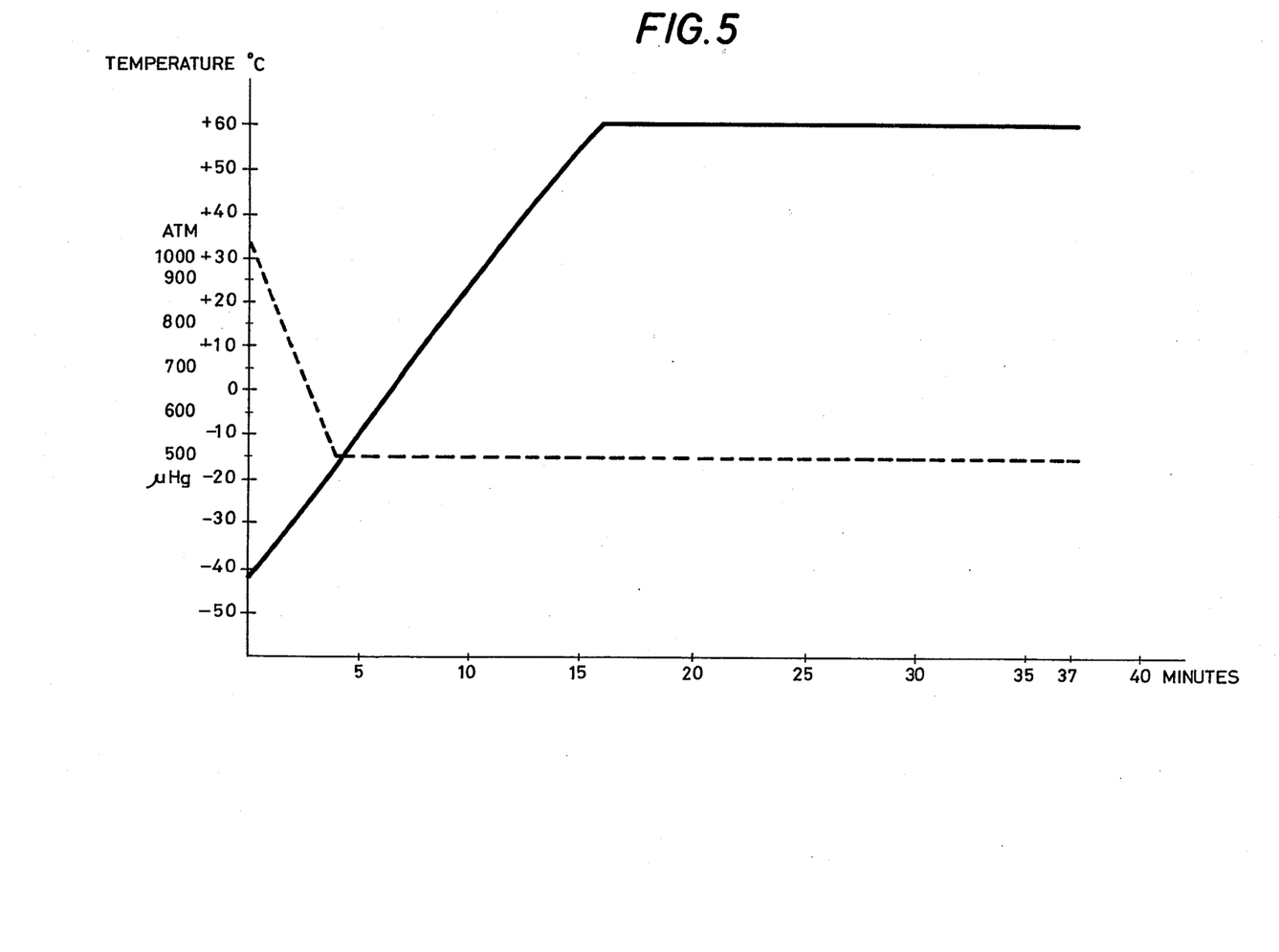

FIG. 5 illustrates the method of the invention as applied to a 22 percent tomato juice concentrate. The entire freeze drying cycle required 37 minutes with the temperature being raised, as shown by the solid curve, from approximately −42° to almost +60° C in a period of almost 15 minutes, with the temperature then being maintained at this latter value through the remainder of the operating cycle. At the same time the pressure was dropped, as shown by the dotted line curve of FIG. 5, from atmospheric pressure to 500 $\mu$ of mercury in a period of approximately 4 minutes, with the evacuated atmosphere being maintained at this latter pressure throughout the remainder of the operating cycle.

In all of the above examples the initial heating of the material to be freeze dried was carried out with infrared radiation, and as soon as a predetermined differential between the interior and exterior temperatures of the material to be freeze dried was detected, which required only a few minutes, the additional heating by way of creating dielectric losses in the material to be freeze dried was carried out throughout the remainder of the operating cycle simultaneously with the infrared heating.

As may be seen from FIGS. 2–5, the time in minutes is indicated along the abscissa of each graph while the temperature and pressure are indicated along the ordinate, with the solid line curves indicating temperature and the dotted line curves indicating pressure.

In all of the above examples the initial charge of material to be freeze dried was 10 kg/m².

In another series of tests it was verified that with the method of the invention the increase in the thickness of the layer of the material to be freeze dried did not carry with it an increase in the freeze drying time proportional to the square of the thickness of the layer, as is encountered with conventional methods. In contrast with the method and apparatus of the present invention it has been found that the time required for the freeze drying cycle increases only 1.5 times when the thickness of the material to be freeze dried is doubled under ordinary conditions where the material is spread in a manner according to which 10 kg are situated at each square meter.

Figure 6:
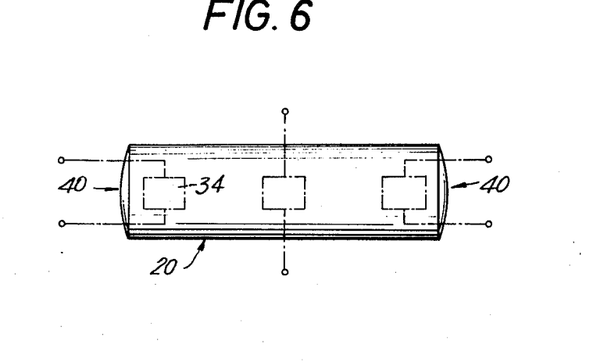
FIG. 6 is a schematic illustration of an evacuated chamber as seen from the exterior, FIG. 6 schematically illustrating the sources of infrared heat in the interior of the chamber.

Thus, it will be seen that with the present invention it is possible to carry out the freeze-drying operation in a much shorter time than is possible with conventional apparatus and methods. With the apparatus of the present invention the material which is to be dried is heated simultaneously by infrared radiation as well as by dielectric losses created in the material itself, with the temperature being maintained equal at the interior and exterior of the material from the beginning to the end of the freeze-drying process. The apparatus of the invention includes a hollow housing which defines the evacuated chamber, this housing being shown schematically in FIG. 6 as well as in cross section in FIG. 1. Thus, the evacuated housing means or chamber means 20 is of a cylindrical configuration and has a horizontal axis. The opposed ends of the cylindrical housing means 20 are hermetically closed in a well known manner by suitable sealing doors 40. FIG. 6 illustrates how the several sources 34 of infrared radiation, which are conventional may be distributed in the interior of the housing means 20 in order to expose the material to be freeze dried to heat resulting from infrared radiation.

As has been indicated above, a number of heating plates are situated in the interior of the housing means 20, these plates 22, 24, 26, and 28 of FIG. 1 being themselves in the form of capacitor plates or electrodes between which the material 32 to be freeze dried is situated to form the dielectric in which the dielectric losses are created to generate heat in the interior of the material to be freeze dried. However, it is possible also to provide an arrangement according to which separate supporting plates are provided to carry the material as described in greater detail below in connection with FIG. 7, the several plates carrying material to be freeze dried. The heating plates may be situated in the interior of the housing means 20 with suitable boards being situated above the heating plates and carrying the material to be freeze dried. The interior of the housing means 20 is connected with one or a plurality of condensers and these in turn are connected in turn with a vacuum source by means of tubes of relatively large diameter having a cross section which minimizes the resistance to gas flow. The heating plates which are inside the housing means may take the form of a tubular network the ends of which are connected to a boiler where oil is heated and forced to circulate through the tubular network forming the heating plates, by way of a suitable circulating pump.

Figure 7:
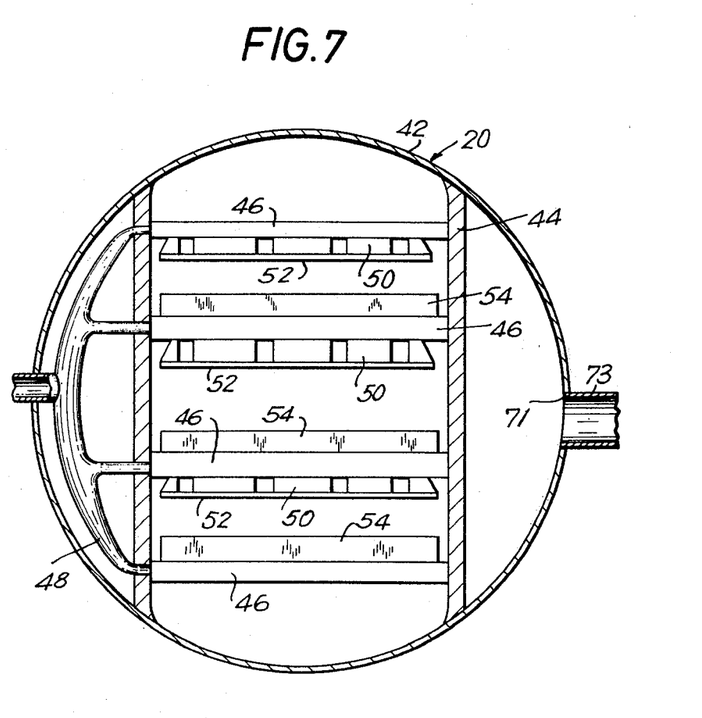
FIG. 7 is a schematic transverse sectional elevation of the chamber of FIG. 6 showing the manner in which structure is arranged therein as well as the manner in which various connections are made with the interior of the chamber.

Thus, although the housing means 20 may have any desired configuration it is preferred to utilize the cylindrical configuration shown in FIG. 1, the wall of the housing means 20 being made of steel and having the hermetically closed doors 40 at its opposed ends, as shown in FIG. 1. The thickness of the steel walls is chosen so as to be able to withstand a differential pressure of one atmosphere (14.2 psi). The evacuated chamber has its longitudinal axis situated horizontally as shown in FIG. 1 and in the interior of the chamber are the various plates the number of which varies with the size of the chamber, these plates being maintained in horizontal planes in parallel relationship by way of structure fixed to the wall of the chamber, as schematically shown in FIG. 7. Thus, FIG. 7 shows the wall 42 of the housing means 20 connected with suitable interior vertically extending supporting walls 44 between which are located the plates 46 which are connected to and supported by the walls 44. The distance from each plate 46 to the next plate 46 is maintained equal, and is never more than 4 inches and never less than 2.25 inches. This fixing of the plates 46 to the supporting structure 44 permits a perfect insulation for the high frequency currents. However, the supporting structure may be of a non-insulating nature, in which case the entire metallic assembly is grounded. The plates 46 are hollow and are internally provided with a network of tubes in which circulates the heating fluid, although it is equally possible to bring about the heating by way of electrical resistances. The tubular networks of the plates 46 are connected with a conduit means 48 made of an insulating material and having a diameter which makes possible a sufficient flow of heating fluid in order to rapidly change the temperature of the plates which may attain 400° F (200° C).

Figure 8:
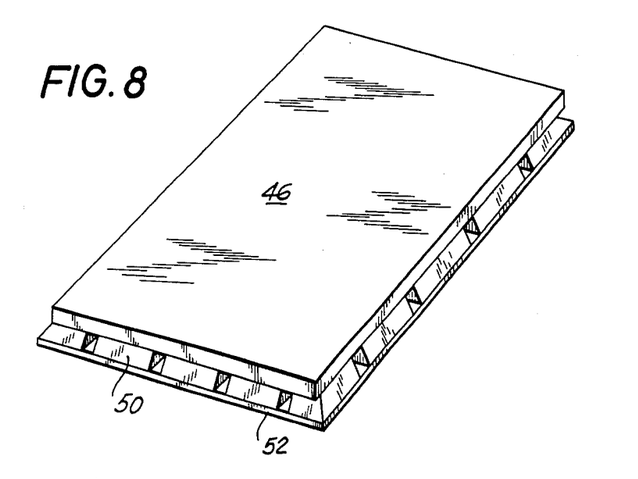
FIG. 8 is a perspective illustration of a support plate showing electrical conductors and insulators situated at the lower surface thereof.

All except the lower plate 46 carry at their lower surfaces, respectively, rings 50 of insulating material which carry high-frequency conductors 52 made of a copper or aluminum mesh. However, it is possible to eliminate the insulated electrodes 52 and instead the heating plates 46 themselves may serve as electrodes, as is shown for the plates 22, 24, 26, and 28 in FIG. 1. The arrangement of the insulating rings 50 beneath a plate 46 carrying the high-frequency conductor network 52 is illustrated also in FIG. 8.

Figure 9:
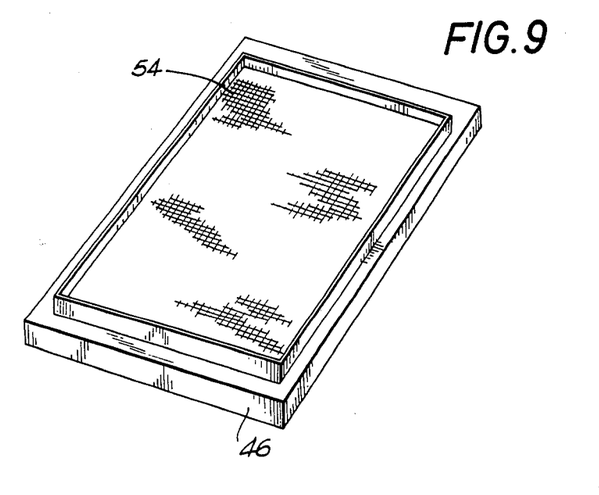
FIG. 9 is a perspective illustration of a support plate showing thereon the electrically conductive structure which carries the material to be freeze dried.

All of the plates 46 except the upper plate 46 of FIG. 7 carry at their upper surface an electrically conductive mesh of copper or aluminum which directly carries the material to be freeze dried. Thus all except the upper plate 46 of FIG. 7 are shown carrying the electrically conductive meshes 54 on which the material to be freeze dried is directly supported. FIG. 9 also shows a plate 46 carrying at its upper surface the electrically conductive mesh 54 on which the material to be freeze dried is located.

In the event, as shown in FIG. 1, that the heating plates also serve as electrodes, the structure such as supporting boards which directly carry the material to be freeze dried are not placed on the heating plates directly but instead on a metallic structure which is fixed in the upper or lower parts of the housing means 20, the electrical connection then being carried out by means of a material which is insulating for high-frequency currents.

Figure 10:
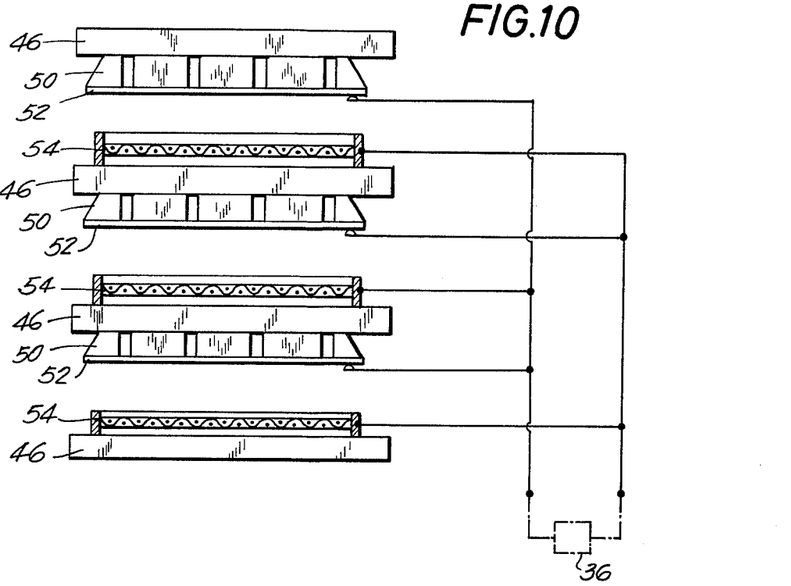
FIG. 10 is a schematic illustration of an electrical connection with the structure of FIGS. 7–9, this electrical circuit being somewhat different from that of FIG. 1.

The upper electrically conductive meshes 54 which carry the material to be freeze dried and the lower electrically conductive networks 52 which are insulated from the heating plates 46 are electrically connected in the manner shown in FIG. 10 to a generator means 36 which serves as a high-frequency generator. With the electrical connections as shown in FIG. 10 there is an electrical supply which never generates a radio frequency field at locations near metallic structures of the insulation but only between the supports for the material to be freeze dried, these supports 54 also serving as capacitor electrodes. Thus each upper plate or electrode 52 and plate or electrode 54 therebeneath form a pair of capacitor electrodes or plates between which a dielectric formed by the material to be freeze dried is located.

Of course, in the case of FIG. 1 where the heating plates themselves serve as the capacitor electrodes, the heating plates are directly connected to the radio-frequency generator means 36 as illustrated in FIG. 1, and in this case the housing means is grounded.

Figure 11:
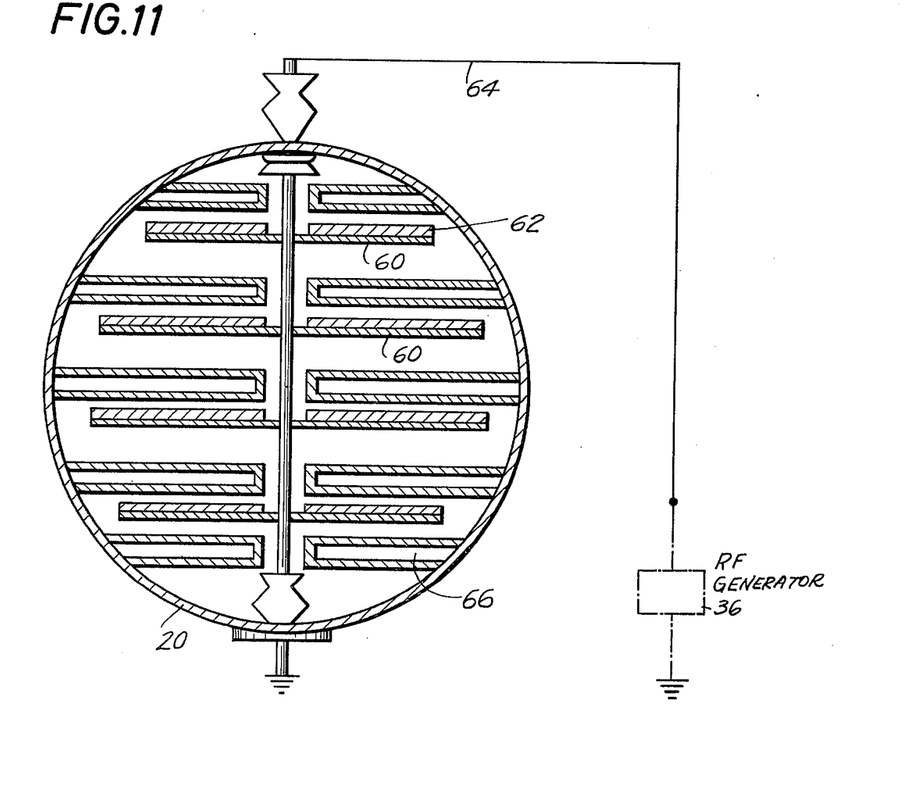
FIG. 11 is a schematic representation of a further embodiment of an electrical circuit used with structure in the interior of the evacuated chamber which is schematically illustrated in FIG. 11.

Thus, referring to FIG. 11, there is illustrated therein an arrangement where the plates 60 which directly carry the material 62 which is to be freeze dried are electrically connected by way of the conductor 64 to the source 36 which forms the radio-frequency generator, while on the other hand the entire housing means 20 and the heating plates 66 carried thereby are grounded. This arrangement which is shown in FIG. 11 provides in the interior of the housing means 20 a radio-frequency field which requires a larger consumption of energy but which at the same time facilitates the construction.

Referring to FIG. 7 it will be seen that the wall 42 of the housing means 20 is provided with an opening 71 communicating through a pipe connection 73 with a condenser assembly described in greater detail below. The opening 71 is preferably situated at equal distances from the top and bottom plates 46 and the diameter of the pipe 73 is chosen so as to provide a small resistance to the flow of gases. It is clear that the size of the pipe 73 will depend upon the quantity of vapor which is to be withdrawn from the evacuated chamber 20 as well as upon the rate of delivery of the vacuum-generating equipment.

Figure 12:
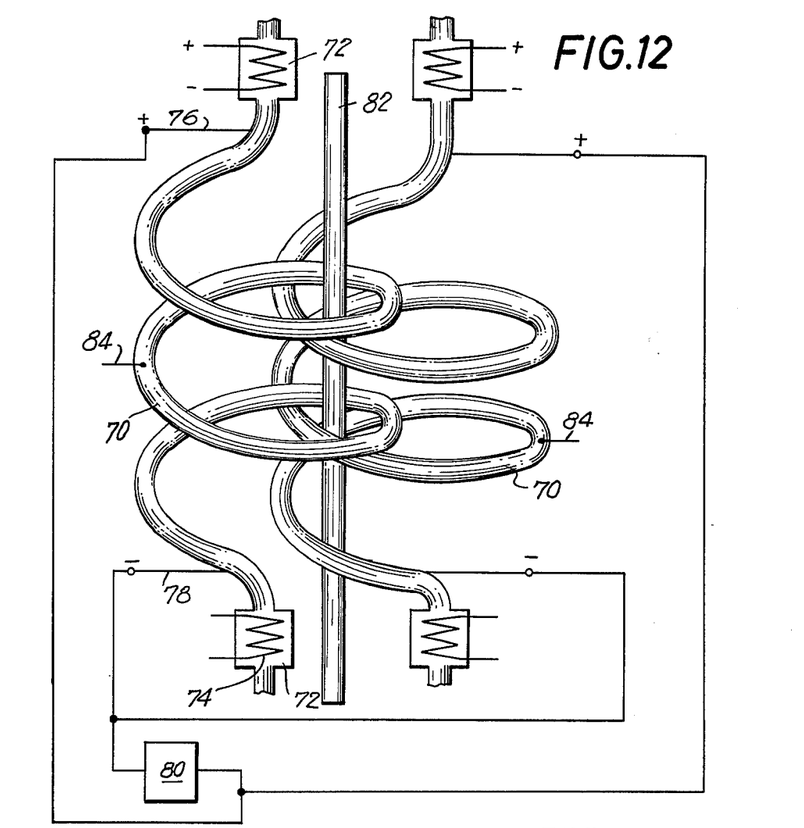
FIG. 12 is a schematic illustration of a condenser according to the invention.

As is the case with conventional installations, the water vapor condenser has a dual operation in that when one half of the condenser installation is used for fixing or depositing water out of the vapor the other half is operating to provide an unfreezing action, according to which the temperature is raised above the freezing temperature. For this purpose the condenser installation is provided with valves, described below in connection with FIG. 13, to establish and interrupt the connection between the condenser installation which is fixing water vapor and the freeze-drying chamber 20. However, with the structure of the present invention each condenser includes two tubular coils (FIG. 12) which have parallel axes and which are situated with the convolutions of one coil situated between the convolutions of the other coil. Thus, FIG. 12 shows the two condenser coils 70 situated in such a way that they have a common axis around which the coil convolutions extend with the convolutions of one coil being situated between the convolutions of the other coil. The ends of each coil 70 respectively communicate with a pair of relatively short tubes 72 which are electrically and thermally insulated and which are connected to unillustrated refrigerating equipment so that a refrigerating fluid will in this way flow through the condenser coils 70. Each relatively short tubular section 72 carries at its exterior surface an electrical resistance 74 which is connected to a source of electricity providing a rate of heating in such a way that the external surface temperature of each short tube section 72 is on the order of 40° F (+4° C). The electrical resistances 74 are connected with a low voltage electrical supply. The metallic tubular coils 70 through which the refrigerating fluid flows in turn are respectively connected at their ends to positive and negative poles of a high voltage electrical supply of direct current. Thus FIG. 12 shows the connections 76 and 78 at the opposed ends of each coil 70 electrically connected to the positive and negative terminals of the schematically illustrated direct current source of high voltage 80. The coils 70 may be provided at their exterior surfaces with ribs or fins in order to increase the condensation surface, but a perfect thermal insulation is maintained between the ribs or fins of one coil and the ribs or fins of the other coil.

In order to provide an induction type of heating, the tubular coils 70 surround an insulated cable or conductor 82 which is connected with the high-frequency current generator, such as the generator 36, while additional conductors 84, schematically indicated in FIG. 12, provide connections of the coils 70 with the high-frequency generator such as the generator 36.

Figure 13:
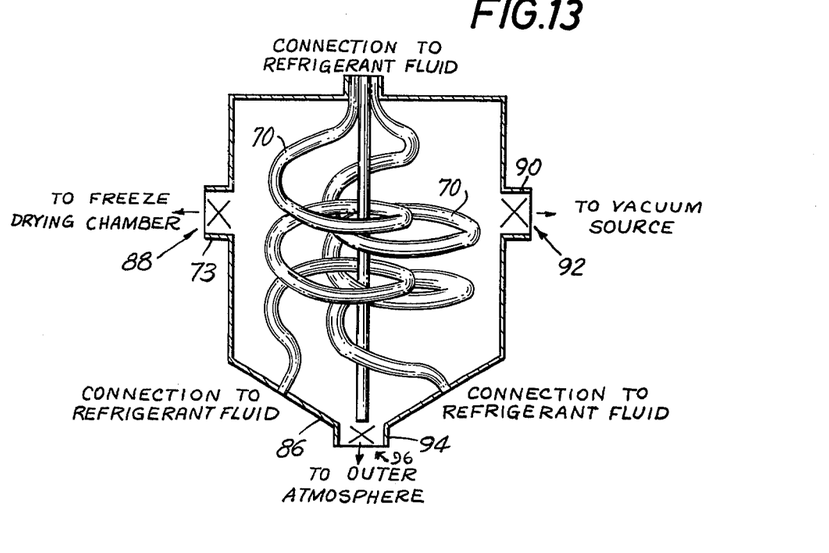
FIG. 13 is a schematic illustration of a tank for accommodating the condenser of FIG. 12 and having various valves and connections for establishing connection and disconnection in a predetermined manner between the interior of the tank and various components as well as the outer atmosphere.

This entire assembly which is shown in FIG. 12 is situated in the interior of a tank 86 illustrated in FIG. 13. This tank 86 of FIG. 13 has the illustrated tubular connections with the other equipment as well as with the outer atmosphere and in these tubular connections are situated the several valve means as illustrated.

As may be seen from FIG. 13, the coils 70 of the condenser assembly, which is situated in the tank 86, extend through upper and lower portions of the tank 86 so as to communicate with the refrigerating liquid which flows through the coils. At its left, as viewed in FIG. 13, the tank 86 has a connection with the pipe 73 which is shown at its other end in FIG. 7, so that in this way through the pipe 73 the interior of the tank 86 communicates with the interior of the housing means 20 in which the freeze drying takes place. At the region of the tank 86 the pipe 73 carries a valve means 88 which is controlled to open and close the pipe 73 in a manner described below.

At its right portion, as viewed in FIG. 13, the tank 86 communicates with the interior of a pipe 90 which leads to a source of vacuum such as a suitable vacuum pump, and a valve means 92 is carried by the pipe 90 at the region of the tank 86. Thus through the pipe 90 and the valve means 92 both the interior of the tank 86 and the interior of the housing means 20 are evacuated, or when the valve 92 is closed the communication with the source of vacuum is interrupted.

At its lower end the tank 86 communicates with the interior of a pipe 94 which communicates with the outer atmosphere and which carries a valve means 96 at the region of the tank 86. By way of this valve means 96 the pipe 94 is opened and closed in order to place the interior of the tank 86 in communication with and out of communication with the outer atmosphere.

The valves of FIG. 13 are operated in such a way that when water vapor is being deposited or fixed out of the fluid sucked from the vacuum chamber into the condenser tank 86, the valves 88 and 92 are open while the valve 96 is closed, so that at this time both the interiors of the housing means 20 and the tank 86 are under vacuum while the interior of the tank 86 is out of communication with the outer atmosphere.

During an unfreezing operation, however, the valves 88 and 92 are closed and the valve 96 is opened so that at this time the condensing tank 86 is no longer in communication either with the source of vacuum or the freeze drying chamber 20 and instead the interior of the tank 86 communicates only with the outer atmosphere.

With the equipment of the present invention it is also possible to situate the condenser assembly directly in the housing means 20, particularly at the lower part thereof. In this case each condenser is provided also with a connection to the interior of the freeze-drying chamber, with a connection to the source of vacuum, and with a connection to the outer atmosphere as is the case with the separate tank 86 of FIG. 13.

The source of vacuum connected to the pipe 90 with the installation of the present invention is the same as vacuum generators used with conventional freeze-drying equipment.

The fluid which circulates in the interior of the plates 46 is heated in a boiler, as is also the case with conventional equipment, and the conduit system is also connected with a tank containing the heating fluid at ambient temperature, enabling in this way mixtures of heated and ambient temperature fluid to be provided in order to facilitate the regulation of the temperature of the plates.

Thus with the apparatus of the present invention heating is applied simultaneously by way of infrared radiation as well as by way of dielectric losses resulting from the radio frequency in the capacitor assemblies where the product to be freeze dried acts itself as the capacitor dielectric. This apparatus of the invention uses unconventional sources of energy. Thus among these unconventional sources of energy are a high frequency current generator which supplies 20 percent of the energy required to carry out the freeze drying of the food product. This generator is used for heating not only the material to be freeze dried but also in order to heat the condenser, such as that shown in FIG. 12. In addition, a high voltage direct current generator is used. For this purpose the direct current generator which supplies energy to the plates of the electronic tubes of the high frequency generator is utilized. In addition use is made of a low voltage alternating current generator. For this purpose a small transformer may be used in order to supply a current of 2–5 volts.

When the high frequency current generator is connected with the freeze-drying chamber a shunt connection is used, and for the connection with the condenser a tank circuit is used.

The high frequency current generator is of the same type as that used in other dielectric heating devices since in the case of freeze drying only a certain frequency is required which should be maintained during the entire process at a substantially constant value which does not vary by more than 10 percent.

With the apparatus of the invention a single high frequency generator is used for heating the material situated at all of the levels in the evacuated freeze-drying chamber. However, it is also possible to use instead a plurality of generators in which case each generator may be used to heat a given part of the material which is to be freeze dried. This latter arrangement enables lower voltages to be used at the generators and thus facilitates their construction, enabling less expensive and less powerful generators to be used, and in addition the construction of the electrical installation in the interior of the housing means 20 is rendered less expensive and simpler. However it is to be noted that when utilizing a plurality of generators in this way the phase of oscillation in all of the generators should, at the beginning of a heating operation, be precisely determined in order to avoid localized heating which would result in nonuniform heating of the material at the various levels, resulting in this way in a much higher energy consumption which would be undesirable.

As has been indicated above, the control system for dielectric heating with the apparatus of the present invention is carried out by means of a cybernetic feedback arrangement.

When the structure which carries the material to be freeze dried is loaded with this material, the latter brings about through its dielectric constant the creation of the capacitance of the electrical capacitor formed by the capacitor electrode structure beneath the material and the capacitor electrode structure over the material. During the drying of the material the dielectric constant thereof changes since the food product which is to be freeze dried is not homogeneous from a physical and chemical point of view. At the end of the freeze drying operation the dielectric constant of the food product has a value which is different from the value of this constant at the beginning of the freeze drying cycle. In the same way the dielectric constant has different values if the water within the material is in a frozen or in a liquid state.

With the apparatus of the invention it is possible to interrupt and reestablish the operation of the high-frequency generator for certain values of the capacitance of the capacitors which utilize the food product as a dielectric material, these capacitors of course being formed by the structure supporting the food product and the electrodes thereover, with the food product itself being dried as a result of the dielectric losses.

When the temperature of the food product which is drying approximates the unfreezing range, which is to say when the temperature of the food product approaches a temperature at which it will no longer be in a frozen state, the cybernetic system detects this latter condition and interrupts the dielectric heating while actuating an electromagnetic valve in the circuit which controls the infrared radiation, and this electromagnetic valve will automatically bring about a mixing of a cold fluid with the heated fluid so as to reduce the extent of heating of the material and thus maintain the material at all times in its frozen condition. At the end of a freeze drying operating cycle, when the freeze drying operation is completed, this same device interrupts the simultaneous heating by way of the infrared radiation and the dielectric loss.

With the apparatus of the invention various unillustrated instruments are included such as a vacuum gauge, various thermometers for measuring the temperature of the heating plates, of the heating fluid, as well as of the food product which is undergoing a freeze drying operation and of the condensers. In connection with the material which is being freeze dried there are in fact a pair of thermometers, one engaging the exterior surface of a body of the material which is being freeze dried and the other situated in the interior of the body of material which is being freeze dried, so that the temperature differential may be detected as pointed out above. In addition instruments are provided for measuring the capacitance of the capacitors which are created in the interior of the freeze-drying chamber in accordance with the present invention, and the apparatus also includes frequency-meters which indicate the frequency of the operating cycle of the high-frequency current generators. In addition various volt meters and ammeters are used.

What is claimed is:

1. In a process for freeze drying a food product, the steps of situating the food product while it is in a frozen condition in an evacuated chamber between a pair of capacitor electrodes for utilizing the food product as a dielectric between said electrodes, initially exposing the latter food product, while it is situated between said capacitor electrodes, to the heat of infrared rays for extracting water from the food product by sublimation and evaporation, and after initially exposing the food product to the heat of the infrared rays for a given length of time and while continuing the exposure of the food product to the infrared rays, electrically energizing said electrodes in a manner producing between the electrodes the energy of a radio frequency field which is transformed into thermal energy by dielectric losses which occur in the interior of the food product for heating the food product simultaneously with infrared radiation and with said thermal energy resulting from dielectric losses, only after initial heating with the infrared rays for said given length of time.

2. In a method as recited in claim 1 and wherein the simultaneous exposure of the food product to infrared rays and the radio frequency field is carried out while maintaining the temperature at the surface of the food product and at the interior thereof equal at all times.

3. In a method as recited in claim 1 and generating the radio frequency field from sources such as electronic valve generators, magnetron generators, Klystron generators, or amplitron generators, with a plurality of the generators which are of relatively small power being joined together in order to achieve more power as required, the evacuated freeze drying chamber including plates which form said capacitor electrodes, and including the step of electrically connecting a group of the plates to each generator.

4. In a method according to claim 1 and selecting the degree of evacuation of the freeze drying chamber in accordance with the material which is freeze dried, in accordance with the organoleptic properties which it is desired to maintain in the material as well as in accordance with the frequency and intensity of the radio frequency field, while maintaining the value of the vacuum in the evacuated chamber between 10 and 1,000 $\mu$ of mercury.

5. In a method according to claim 1 and wherein in order to bring about ionization and polarization of the molecules of free water of the material, to orient the movement and increase the speed of the molecules with respect to a condensing surface and the quantity of water extracted, use is made, for fixing the extracted ionized water, of at least one condenser constituted by a pair of tubular sections while directing a refrigerating fluid through one of the sections toward the other in a tubular section which is electrically and thermally insulated and superficially heating the tubular section by an electrical resistance element.

6. In a method as recited in claim 5 and including the step of establishing an electrostatic field around the condenser by connecting the tubular sections thereof to the poles of a direct current generator such as a direct current generator which is used for driving a high-frequency oscillator.

7. In a method as recited in claim 5 and including the step of utilizing two condensers alternately while making use of heat of the condensers to bring about rapid unfreezing by induction and utilizing as a source of energy that source which is utilized to heat the food product by dielectric losses.

8. In a method as recited in claim 1 and operating a cybernetic feedback system according to variations in the dielectric constant of the food product while responding to variations in temperature and approaching the point of fusion of the food product, while the quantity of water in the food product diminishes for controlling the heating of the food product.

9. In a method according to claim 1 and interrupting the heating of the food product by dielectric losses above and below predetermined values of the dielectric constant, while also interrupting at more elevated values the heating by infrared rays.

10. In a freeze drying apparatus, infrared means for heating a material which is to be freeze dried with infrared radiation, and capacitor means having a pair of capacitor elements for accommodating the material which is to be freeze dried between said capacitor elements, said capacitor elements having with respect to said infrared means a location which will expose the material between said capacitor elements to the infrared radiation, so that heating of the material to be freeze dried is carried out by dielectric losses in the material to be freeze dried as well as by heat resulting from infrared radiation.

11. The combination of claim 10 and wherein a generator means is operatively connected with said capacitor means for generating a radio frequency field between said capacitor elements to achieve the dielectric heating of the material to be freeze dried, said capacitor means including at least a pair of plates to which said generator means is electrically connected.

12. The combination of claim 11 and wherein a plurality of said generator means are connected in a shunt connection and also are capable of being connected in a tank circuit with the frequency controlled by means of a crystal.

13. The combination of claim 10 and wherein an enclosure means encloses the infrared heating means and the capacitor means for situating the latter together with the material which is to be freeze dried in an evacuated atmosphere which has a pressure between 0.004 and 0.0004 inches of mercury.

14. The combination of claim 10 and wherein an evacuated enclosure means houses the infrared heating means and the capacitor means as well as the material to be freeze dried, condenser means communicating with the interior of said enclosure means for condensing water extracted from the material to be freeze dried, and means cooperating with said condenser means for situating the latter in an electrostatic field for achieving an ionization and polarization of the water molecules which travel toward the surface of said condenser means.

15. The combination of claim 14 and wherein said condenser means includes two independent tubular sections and electrically and thermally insulated connecting means interconnecting said sections, a source of direct current being electrically connected with each of said tubular sections, and electrical resistance means situated at the surface of the insulated means which interconnects the tubular sections for heating the insulated means.

16. The combination of claim 14 and wherein a pair of said condenser means communicate with the interior of said enclosure means with said pair of condenser means alternately operating for condensing and unfreezing.

17. The combination of claim 16 and wherein an induction means is electrically connected with each condenser means to achieve the unfreezing operation thereof, each tubular condenser section being in the form of a coil and the insulated means being in the form of a cable situated in the interior of and surrounded by said coil, with the source of energy used for achieving the radio frequency field to provide the dielectric loss at the material to be freeze dried being also electrically connected as a source of energy for the induction means, said insulated means being electrically connected with an insulated terminal of a radio-frequency generator which is connected in shunt.

18. The combination of claim 10 and wherein an enclosure means hermetically encloses the infrared heating means and the capacitor means, said enclosure means being of a cylindrical configuration and having a horizontal axis and carrying in its interior a plurality of plates having a size and shape corresponding to the interior of the enclosure means and situated in horizontal planes in spaced relationship with the distance between successive plates being between 3 and 10 centimeters, each of said plates being hollow and being formed with an internal network of tubes through which a heating fluid is circulated, and a conduit means communicating with the interiors of said tubes for circulating a heating fluid therethrough.

19. The combination of claim 10 and wherein an enclosure means of cylindrical configuration having a horizontal axis encloses said infrared heating means and said capacitor means as well as the material to be freeze dried, and a plurality of electrical resistance plates situated in said enclosure means respectively in horizontal planes and spaced from each other by a distance of between 3 and 10 centimeters.

20. The combination of claim 10 and wherein an enclosure means of generally cylindrical configuration having a horizontal axis encloses said infrared heating means and said capacitor means and carries in its interior a plurality of plates between which the material to be freeze dried is situated, each of the plates except the lower one of the series of plates carrying at its lower surface a material insulated against high frequency current and carrying an electrically conductive network while all except the upper one of the series of plates carry at their upper surfaces also an electrically conductive network which supports the material to be freeze dried, and high-frequency generator means electrically connected with the networks which support the material to be freeze dried, so that the supports for the material to be freeze dried form the capacitor elements to heat the material to be freeze dried by the dielectric losses therein.

21. The combination of claim 10 and wherein an enclosure means of generally cylindrical configuration having a horizontal axis encloses the infrared heating means and the capacitor means, the latter including heating plates which serve as the capacitor elements and a high-frequency generator means electrically connected with said heating plates to create a radio-frequency field in which the material to be freeze dried is located to provide heating of the latter by way of the dielectric losses.

22. The combination of claim 10 and wherein an enclosure means encloses the infrared heating means and the capacitor means and a condenser means communicating with the interior of said enclosure means and including a pair of separate tubular coils and relatively short insulated tubes connecting said coils with a source of refrigerating fluid, said short insulated tubes carrying at their outer surfaces relatively small electrical resistances forming a heating means for maintaining the exterior surface of said insulated tubes at approximately 40° F, a high voltage source of direct current having positive and negative poles respectively connected with opposite ends of each tubular coil.

23. The combination of claim 22 and wherein a tank means houses said condenser means, and said tank means carrying a plurality of connecting means for respectively connecting the interior thereof to the interior of said enclosure means, to a source of vacuum, and to the outer atmosphere, with a plurality of valve means being respectively situated at said plurality of connecting means for controlling the opening and closing of the connecting means to provide a connection of the interior of the tank means with the interior of said enclosure means and with the source of vacuum while closing the communication with the outer atmosphere and for then opening the connection with the outer atmosphere while closing the connection of the interior of the tank means with the interior of said enclosure means and with the source of vacuum.

24. In a method as recited in claim 1, generating infrared radiation, to provide said infrared rays, in the interior of said evacuated chamber.

25. In a method as recited in claim 1, situating said capacitor electrodes in the interior of said evacuated chamber so that the entire radio frequency field is in the interior of said chamber.

26. In a method as recited in claim 25 and including the step of generating infrared radiation, for providing said infrared rays, in the interior of the evacuated chamber.

* * * * *